US005553003A

United States Patent [19]
Harada et al.

[11] Patent Number: 5,553,003
[45] Date of Patent: Sep. 3, 1996

[54] DISTRIBUTED CONTROL SYSTEM

[75] Inventors: Yasushi Harada, Katsuta; Yasunori Katayama; Junzo Kawakami, both of Mito; Tadayoshi Saitou, Hitachiota; Chihiro Fukui, Hitachi; Yutaka Kokai, Katsuta; Shigeru Tamura, Hitachiota, all of Japan

[73] Assignee: Hitachi, Ltd., Tokyo, Japan

[21] Appl. No.: 29,610

[22] Filed: Mar. 11, 1993

[30] Foreign Application Priority Data

Mar. 11, 1992 [JP] Japan ................. 4-052218

[51] Int. Cl.⁶ ........................................ H02J 3/06
[52] U.S. Cl. .................. 364/492; 364/493; 364/138; 364/148; 395/903; 395/907; 395/915
[58] Field of Search ....................... 364/492, 493, 364/495, 138, 139, 132, 148; 395/903, 904, 906, 907, 914, 915, 918

[56] References Cited

U.S. PATENT DOCUMENTS

| | | | |
|---|---|---|---|
| 3,519,998 | 7/1970 | Barron | 395/575 |
| 3,913,829 | 10/1975 | Fink | 364/493 |
| 5,159,562 | 10/1992 | Putman et al. | 364/138 |
| 5,305,230 | 4/1994 | Matsumoto et al. | 364/495 |
| 5,323,328 | 6/1994 | Tanaka | 364/492 |
| 5,333,240 | 7/1994 | Matsumoto et al. | 395/904 |
| 5,355,482 | 10/1994 | Ohhashi et al. | 364/138 |

FOREIGN PATENT DOCUMENTS

| | | |
|---|---|---|
| 0374944A4 | 6/1990 | European Pat. Off. |
| 2-170202 | 7/1990 | Japan. |

OTHER PUBLICATIONS

"An Annovative Approach to Generation Scheduling in Large-Scale Hydro-Thermal Power Systems with Fuel Constrained Units", S. Tong, 8047b IEEE Transactions on Power Systems, May 1990, No. 2, pp. 665–673.

"Review of Distribution System Planning Models: A Model For Optimal Multistage Planning", Prof. T. Gonen, et al, IEE Proceedings-C/Generation, Transmission & Distribution, 133, Nov. 1986, No. 7, Pt. C., pp. 397–408.

Primary Examiner—Emanuel T. Voeltz
Assistant Examiner—Hal D. Wachsman
Attorney, Agent, or Firm—Antonelli, Terry, Stout & Kraus

[57] ABSTRACT

In a control system equipped with a plurality of subsystems and a supervising subsystem for supervising these subsystems, a subgoal achievement performance is calculated by the subsystem using its own knowledge and its own condition with respect to a subgoal defined by the supervising subsystem, and the supervising subsystem controls a control system by utilizing the knowledge and conditions of the respective subsystems by applying a subgoal execution instruction to the subsystem based upon the calculation result. Since not only the knowledge but also the condition of the subsystems, proper controls can be realized in not only such a case that the supervising goal is directed to a static temporal aspect, but also such a case that the supervising goal contains a temporal element.

7 Claims, 14 Drawing Sheets

FROM 204    205                                        206

205:
REMAINING : 30MW
SUBGOAL : AFTER 3 MINUTES, INCREASE BY 10MW AND MINIMIZE FUEL COST.
PERFORMANCE : FUEL COST
  101···50,000YEN
  102···46,000YEN
  103···51,000YEN
  104···80,000YEN
EVALUATION : MINIMUM FUEL COST CORRESPONDS TO GENERATOR 102. WHEN OUTPUT OF GENERATOR 102 IS INCREASED BY 10MW, POWER FLOW OF TRANSMISSION LINE 112 IS 130MW. IT IS DEVIATED FROM SUPERVISING GOAL THE SECOND MINIMUM FUEL COST CORRESPONDS TO GENERATOR 101.
  WHEN OUTPUT OF GENERATOR 101 IS INCREASED BY 10MW, POWER FLOW OF TRANSMISSION LINE 112 IS 130MW. IT IS DEVIATED FROM SUPERVISION GOAL THE THIRD MINIMUM FUEL COST CORRESPONDS TO GENERATOR 103. WHEN OUTPUT OF GENERATOR 103 IS INCREASED BY 10MW, POWER FLOW OF TRANSMISSION LINE 112 IS 120MW ACCORDINGLY, IT IS DEVIATED FROM SUPERVISING GOAL
EXECUTION INSTRUCTION : TO GENERATOR 103.

206:
REMAINING : 20MW
SUBGOAL : AFTER 3 MINUTES, INCREASE BY 10MW AND MINIMIZE FUEL COST.
PERFORMANCE : FUEL COST
  101···50,000YEN
  102···46,000YEN
  103···NOT ALLOW TO INCREASE POWER BY RATE LINITER
  104···80,000YEN
EVALUATION : MINIMUM FUEL COST CORRESPONDS TO GENERATOR 102. WHEN OUTPUT OF GENERATOR 102 IS INCREASED BY 10MW, POWER FLOW OF TRANSMISSION LINE 112 IS 130MW. IT IS DEVIATED FROM SUPERVISING GOAL
  THE SECOND MINIMUM FUEL COST CORRESPONDS TO GENERATOR 101. WHEN OUTPUT OF GENERATOR 101 IS INCREASED BY 10MW, POWER FLOW OF TRANSMISSION LINE 112 IS 130MW. IT IS DEVIATED FROM SUPERVISING GOAL
  SINCE THE GENERATOR 103 IS CONTROLLED BY RATE LIMITER, ONLY GENERATOR 104 REMAINS.
  HOWEVER SINCE GENERATOR 104 REQUIRES EXCESSIVE FUEL COST, POWER FLOW RESTRICTION OF TRANSMISSION LINE 112 IS MITIGATED BY 130MW, SO THAT POWER OF GENERATOR 102 IS INCREASED BY 10MW.
EXECUTION INSTRUCTION : TO GENERATOR 103.

FROM 206

207

REMAINING : 10MW
SUBGOAL : AFTER 3 MINUTES, INCREASE BY 10MW
AND MINIMIZE FUEL COST.

PERFORMANCE : FUEL COST
　　　101⋯50,000YEN
　　　102⋯NOT ALLOWED TO INCREASE
　　　　　POWER BY RATE LIMITER
　　　103⋯NOT ALLOWED TO INCREASE
　　　　　POWER BY RATE LIMITER
　　　104⋯80,000YEN

EVALUATION : MINIMUM FUEL COST CORRESPONDS
TO GENERATOR 101. WHEN POWER OF
GENERATOR 101 IS INCREASED BY 10MW,
POWER FLOW OF TRANSMISSION LINE
112 IS 140MW. IT IS DEVIATED FROM
POWER FLOW RESTRICTION.

GENERATOR 104 REQUIRES
EXCESSIVE FUEL COST. POWER FLOW
RESTRICTION OF TRANSMISSION LINE
112 CANNOT BE MITIGATED. ACCORDINGLY,
RATE LIMITER IS RELEASED TO AGAIN SET GOAL.

SUBGOAL : AFTER 3 MINUTES, INCREASE BY 10MW AND
MINIMIZE FUEL COST, AND ALSO RELEASE
RATE LIMITER.

PERFORMANCE : FUEL COST
　　　101⋯50,000YEN
　　　102⋯55,000YEN
　　　103⋯60,000YEN
　　　104⋯80,000YEN

EVALUATION : MINIMUM FUEL COST CORRESPONDS TO
GENERATOR 101. WHEN POWER OF GENERATOR
101 IS INCREASED BY 10MW, POWER FLOW OF
TRANSMISSION LINE 112 IS 140MW. IT IS DEVIATED
FROM POWER FLOW RESTRICTION.

SECOND MINIMUM
FUEL COST CORRESPONDS TO GENERATOR 102.
HOWEVER, THIS IS ALSO DEVIATED FROM
POWER FLOW OF TRANSMISSION LINE 112
SIMILAR TO GENERATOR 101.

THIRD MINIMUM
FUEL COST CORRESPONDS TO GENERATOR 103.
WHEN POWER OF GENERATOR 103 IS INCREASED
BY 10MW, POWER FLOW OF TRANSMISSION LINE
112 IS 130MW. ACCORDINGLY, IT IS NOT
DEVIATED FROM POWER FLOW RESTRICTION.

EXECUTION
INSTRUCTION : TO GENERATOR 103.

DISTRIBUTED CONTROL SYSTEM

BACKGROUND OF THE INVENTION

The present invention relates to a control apparatus and a method for controlling a system equipped with a plurality of subsystems and a supervising subsystem for supervising these subsystems. More specifically, the present invention is directed to a control method and a control system capable of improving a control performance of an overall system by utilizing self condition amounts detected by the respective subsystems.

In the conventional control system equipped with a plurality of subsystems and a supervising subsystem for supervising these subsystems, as described in JP-A-2-170202, the supervising subsystem divides the supervising goal into subgoals with respect to the respective subsystems, and a subsystem which has received this subgoal evaluates its own subgoal achievement performance using its own knowledge. Further, the supervising subsystem which has received this subgoal achievement performance, again sets the subgoal, if required, to repeat the above-described process, and otherwise sends out an execution instruction to the subsystem, so that the effective control can be realized.

However, in the above-described prior art control system, when the subsystems evaluate the subgoal achievement performances, although the subsystems consider their own local knowledge, these subsystems never consider their own conditions.

Also, as one example of the conventional distributed type control system, there is described such a method of "Autonomous Distributed Type Overload Preventing Monitoring Control Logic" written by Hirata et al., Institute of Electrical Engineers of Japan, Research report RE 89–79, Jul. 20, 1989. In this conventional control system, under an initial condition such that the power systems in a plurality of regions (subsystems) are connected with each other via the tielines, one method has been proposed, which determines the power generating amounts of the respective regions in order to optimize economical subjects within such a range where the tielines are brought into an overload. In accordance with this method, since the subsystem need not consider interference with other subsystems, the respective subsystems merely execute the processes previously given to their own subsystems, so that the above-described goals can be achieved.

However, in accordance with the above-described distributed type control system, the application range of this control method is limited to the above-explained purpose, and no care is taken to such an extraordinary case of the subsystem.

SUMMARY OF THE INVENTION

An object of the present invention is to provide a flexible, effective control system, capable of satisfying a supervising goal containing a temporal element in an optimum condition in a control system equipped with a plurality of subsystems and a supervising subsystem for supervising these subsystems.

The above-described object can be achieved by employing such a method that with respect to the subgoal defined based on the supervising goal by the supervising subsystem, the subsystems calculate the subgoal achievement performances using their own knowledge and their own conditions, and the supervising subsystem evaluates the subgoal achievement performances, again defines the subgoals based on the evaluation results, if required, to repeat the above-described process. Otherwise, the supervising subsystem gives the subgoal execution instruction to the subsystem.

Since such a method is utilized that with respect to the subgoal defined by the supervising subsystem, the subsystems calculate the subgoal achievement performances their own knowledge and their own conditions, and the supervising subsystem gives the subgoal execution instruction to the subsystems based upon this calculation result, the supervising subsystem can control an overall system using the knowledge and conditions of the respective subsystems. Since not only the knowledge but also the conditions are utilized, the control method can be applied not only to such a case that the supervising goal is directed to a static temporal aspect, but also to such a case that a temporal element is contained in the supervising goal.

Moreover, the control method realized by the process connection between the supervising subsystem and the subsystems, according to the present invention, does not especially depend upon the nature of the application range, but can readily accept such a case in which an extraordinary event occurs in the subsystem. As a consequence, the effective control can be achieved with great deal of flexibility.

Also, since the supervising goal is subdivided into very small subgoals, the optimum control can be maintained.

BRIEF DESCRIPTION OF THE DRAWINGS

FIGS. 6, 7 and 8 are process flow charts of the control system shown in FIG. 5;

DESCRIPTION OF THE PREFERRED EMBODIMENTS

Preferred Embodiment 1

Figure 1:
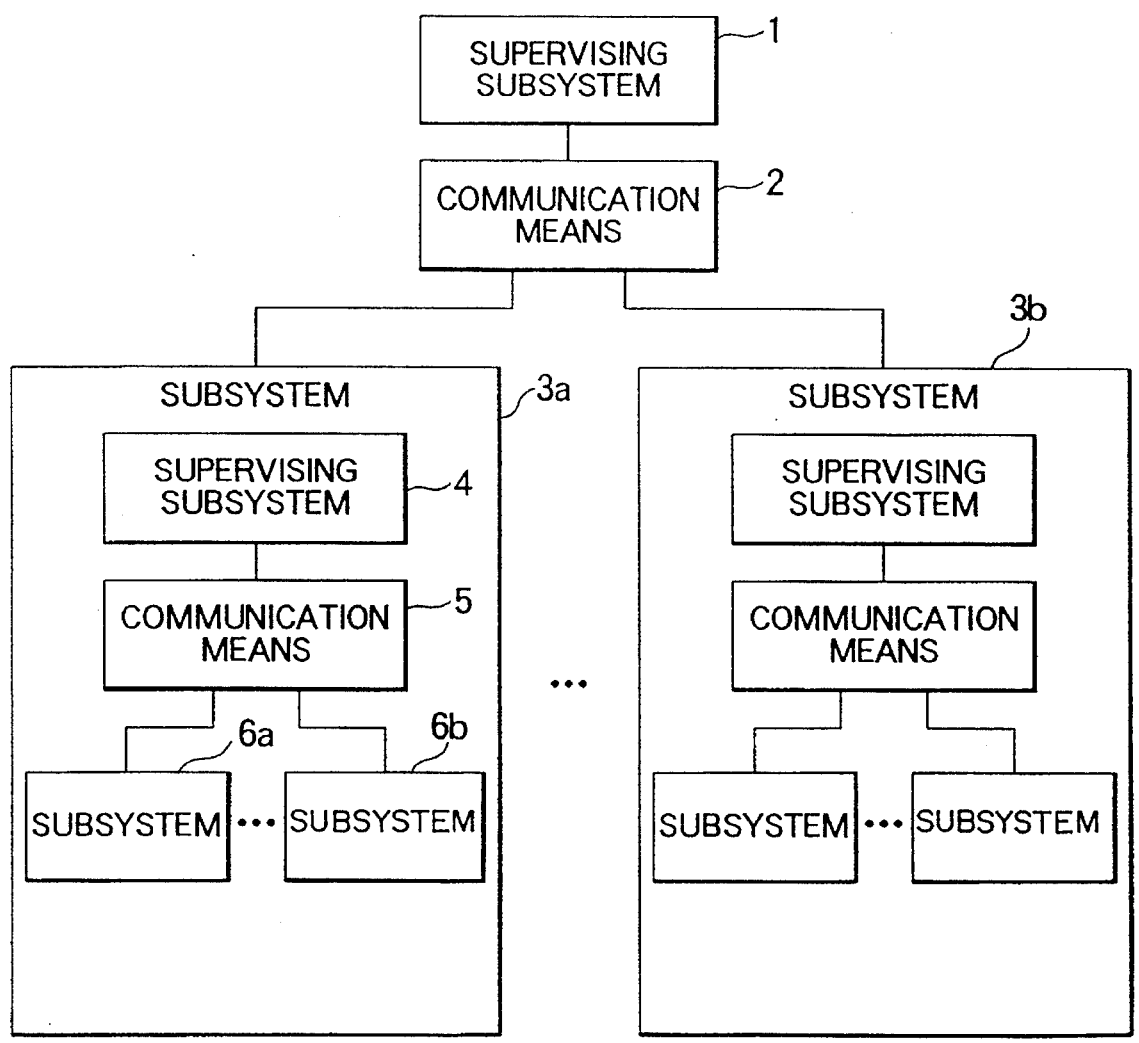
FIG. 1 schematically shows a constructive diagram of a control system according to an embodiment of the present invention.

FIG. 1 schematically shows an arrangement of a control system according to the present invention. The control system is arranged by a supervising subsystem 1, communication means 2, and a plurality of subsystems 3a to 3b. Either the supervising subsystem 1, or the subsystems 3a to 3b are further constructed of a supervision subsystem 4, communication means 5, and a plurality of subsystems 6a to 6b. With such an arrangement, the communications between the supervising subsystems 1 and the respective subsystems 3a to 3b, and the communications between the supervising subsystem 1 and the respective subsystems 3a to 3b can be effectively performed by transferring/receiving only necessary information.

Figure 2:
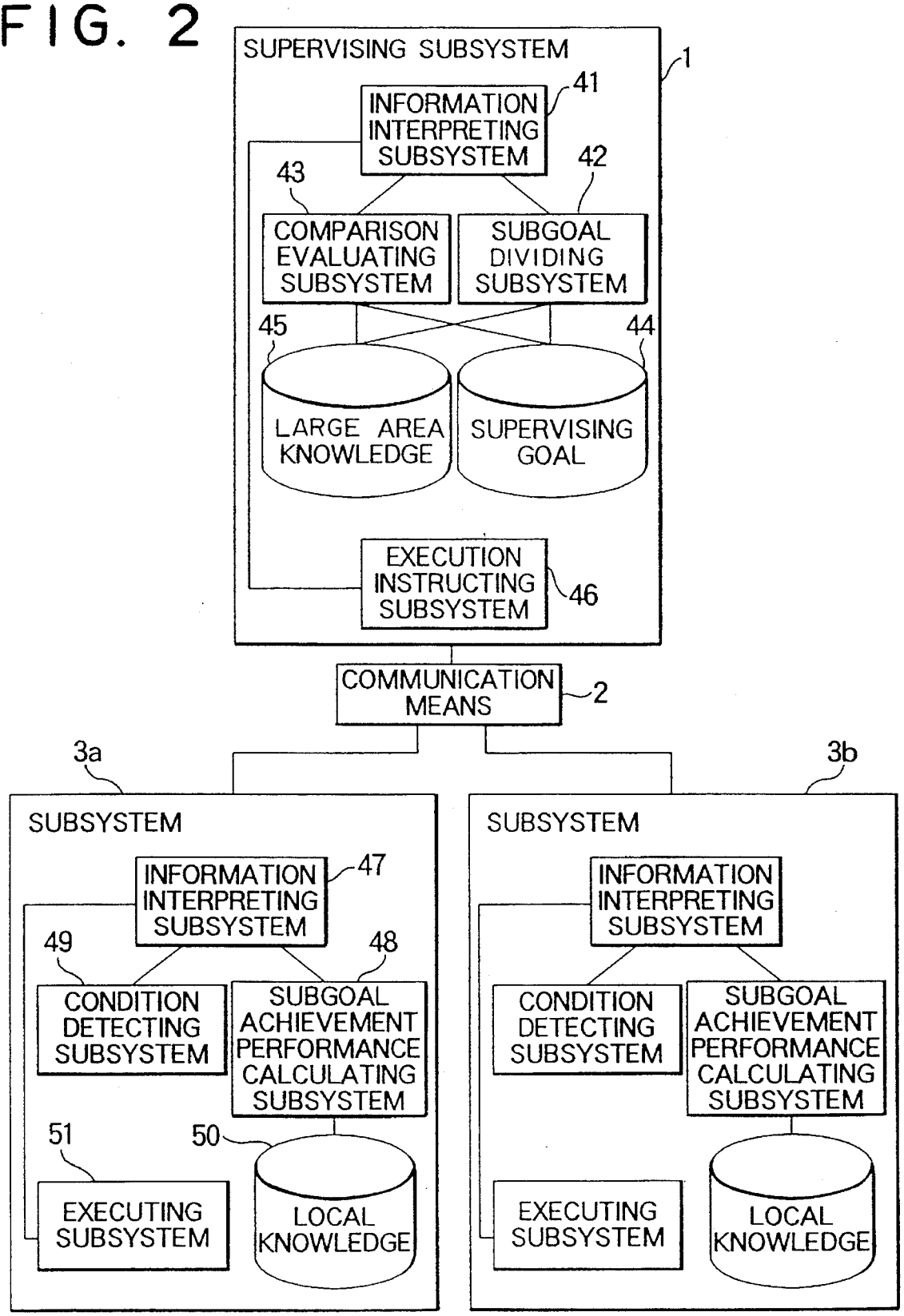
FIG. 2 schematically represents a functional arrangement of the control system shown in FIG. 1.

FIG. 2 schematically shows a functional constructive diagram of the supervising subsystem 1 and the subsystems 3a to 3b. For the sake of a simple explanation, only two subsystems 3a and 3b are represented in FIG. 2. The supervising subsystem 1 includes an information interpreting subsystem 41, a subgoal dividing subsystem 42, a comparison evaluating subsystem 43, a supervising goal 44, a large area knowledge 45, and an execution instructing subsystem 46. Each of the subsystems 3a and 3b includes an information interpreting subsystem 47, a subgoal achievement performance calculating subsystem 48, a condition detecting subsystem 49, a local knowledge 50, and an executing subsystem 51.

Functions of the respective components will now be described. The information interpreting subsystems 41 and 47 execute a process to encode information for transmission and a process to decode information for reception when communication is established with other subsystems by employing the communication means 2. The subgoal dividing subsystem 42 defines a subgoal to be given to the subsystems 3a and 3b based on the supervising goal 44 and the large area knowledge 45. The defined subgoal is transmitted via the communication means 2 to the subsystem 3a and 3b using the information interpreting subsystem 41. The supervising goal 44 corresponds to a control goal as an overall control system. The large area knowledge 45 contains information about an overall system construction, information about the performance of the subsystem, and a past answer (subgoal achievement performance) issued from the subsystem. The execution instructing subsystem 46 determines the subsystem to which the subgoal execution instruction should be transferred, based on the comparison evaluating result made by the comparison evaluating subsystem 43, or determines to again define a subgoal.

The subgoal achievement performance calculating subsystem 48 employed in the subsystem 3a, calculates an execution performance of the subgoal given by the supervising subsystem 1 with employment of the condition of the subsystem detected by the condition detecting subsystem 49 and the local knowledge 50. The executing subsystem 51 corresponds to such a portion to carry out the subgoal upon receipt of the subgoal execution instruction from the supervising subsystem 1. In FIG. 2, it is also possible that a role of a supervising subsystem is filled by the subsystems 3a and 3b by similarly providing the subgoal dividing subsystem, the comparison evaluating subsystem, the large area knowledge, the supervising goal, and the execution instructing subsystem, and furthermore a plurality of subsystems are newly employed in the respective subsystems 3a and 3b.

Figure 3:
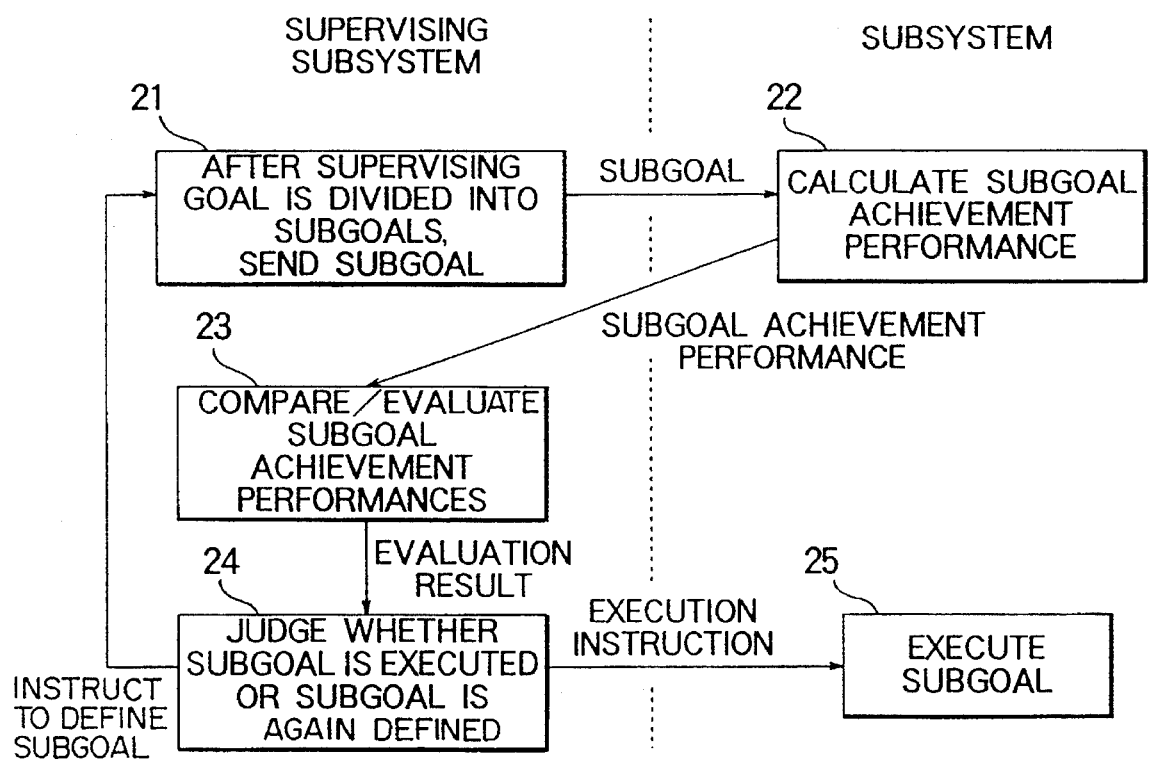
FIG. 3 is a schematic diagram for showing a process flow of the control system indicated in FIG. 1.

FIG. 3 schematically represents a process flow operation between the supervising subsystem and the plural subsystems. Referring now to FIG. 3, the process flow operation will be described. At a first process 21, the supervising subsystem divides the supervising goal into the subgoals, and one of these divided subgoals is transmitted to the respective subsystems. At a process 22, upon receipt of the subgoal, the relevant subsystem calculates the subgoal achievement performance, and then transmits the subgoal achievement performance to the supervising subsystem. At a process 23, upon receipt of the subgoal achievement performance, the supervising subsystem compares these subgoal achievement performances received from the respective subsystems with each other, and evaluates the comparison results. Based upon the comparison results, the supervising subsystem judges whether the subgoal is executed by the subsystem, or the subgoal is again defined at a process 24. If a judgement is made that the subgoal is executed by the subsystem, then the supervising subsystem transmits the execution instruction to such a subsystem that the subgoal should be executed. To the contrary, if another judgement is done that the subgoal is again defined, the process flow operation is returned to the previous process 21. At a process 25, the subsystem which has received the execution instruction executes the subgoal.

Preferred Embodiment 2

Figure 4:
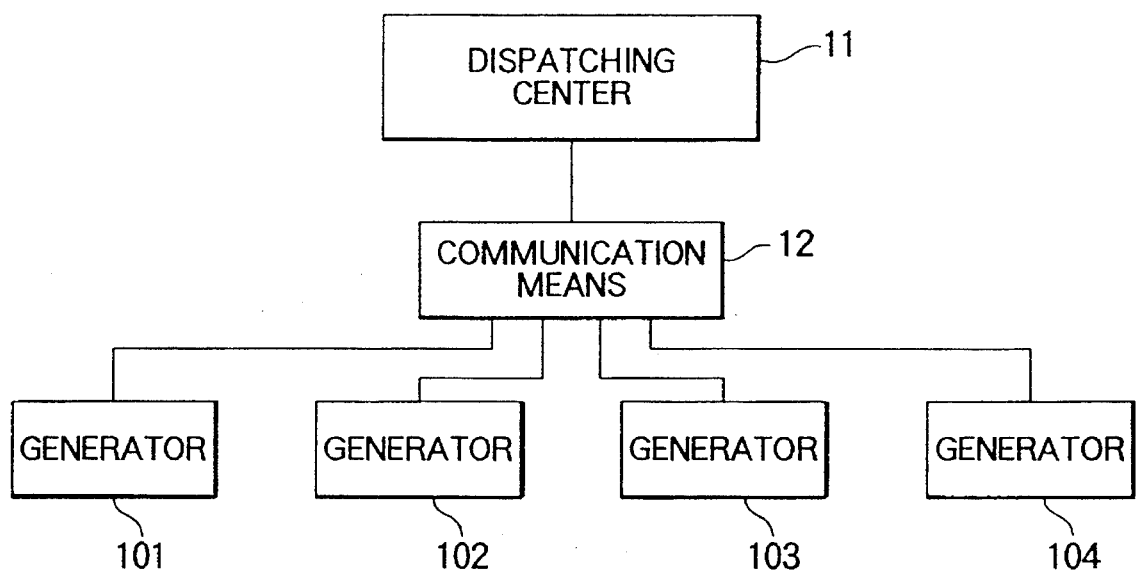
FIG. 4 schematically indicates an overall system arrangement of a generator power distribution controlling system as an example of the control system according to the present invention.

A description will now be made of operation of a control system for determining a power distribution of plural generators. An arrangement of the control system is shown in FIG. 4. The control system includes a dispatching center 11, communication means 12, and a plurality of generators 101, 102, 103 and 104. Although several tens of generators are actually operated in the practical power system, only four generators are employed in this preferred embodiment, for the sake of easy explanation. The present conditions are assumed that a total power generation amount is 2000 MW, and power generated from the generators 101, 102, 103, 104 is 500 MW, 60 MW, 300 MW and 600 MW, respectively. In the respective generators, a power variation speed thereof is limited by the rate limiter, and the limit value thereof is assumed to 30 MW per 3 minitues. It should be noted normally, the rate limiter is set to such a lower value than the designed limit value, and therefore the generator can produce the power variation speed higher than the limit value when the rate limiter is released.

Figure 5:
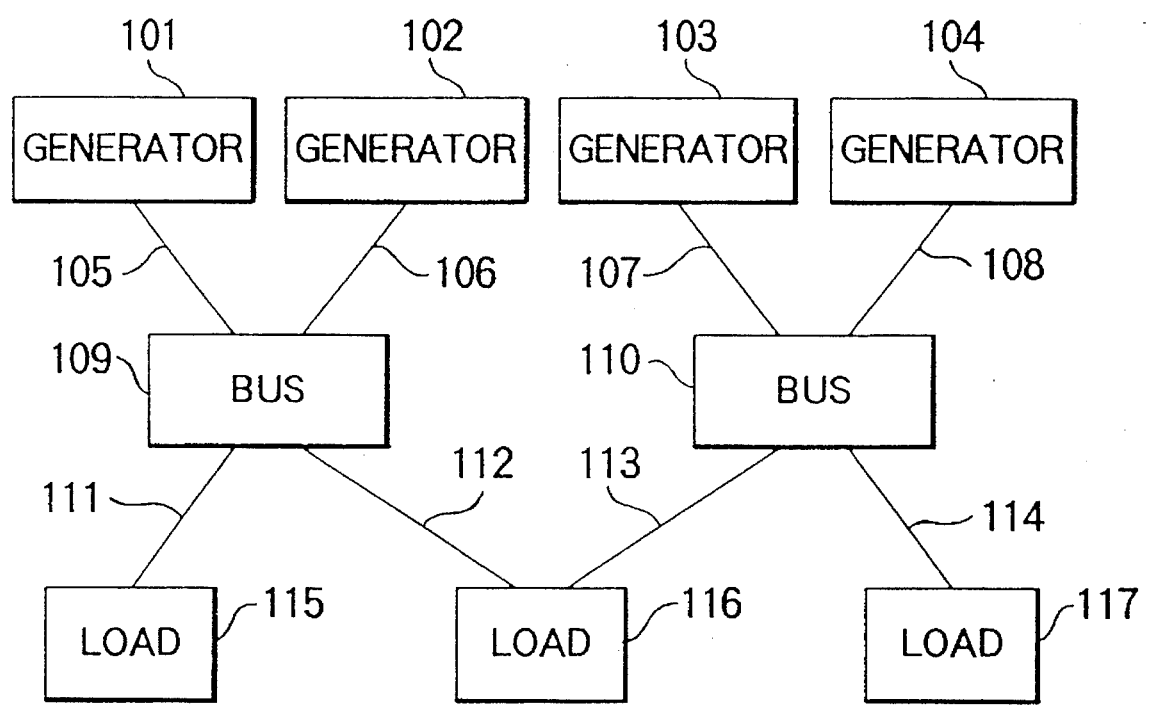
FIG. 5 shows a system configuration of the control system shown in FIG. 4.

In FIG. 5, there is shown a system configuration. The generators 101 and 102 are connected via transmission lines 105 and 106 respectively to a bus 109, whereas the generators 103 and 104 are connected via transmission lines 107 and 108 respectively to a bus 110. The transmission line 111 connects the bus 109 with a load 115, the transmission line 112 connects the bus 109 with a load 116, the transmission line 113 connects the bus 110 with a load 116, and also the transmission line 114 connects the bus 110 with the load 117. It is now assumed that present capacities of the load 115, 116 and 117 are, for instance, 1000 MW, 500 MW and 500 MW, respectively. In this case, for example, in accordance with the method as described in Japanese book "Basic Technical Calculation on Power System" written by Kouzou Aratame, issued in September 1980 by Denki Shoin, pages 180 to 195, power flows flowing through the transmission lines 105, 106, 107, 108, 111, 112, 113 and 114 become 500 MW, 600 MW, 300 MW, 600 MW, 1000 MW, 100 MW, 400 MW and 500 MW respectively.

Under such a circumstance, a prediction is made that after 3 minutes, the capacity of the load 117 is increased from 500 MW to 570 MW. At this time, it is assumed that the following supervising goal is designated by an operator.

Supervising Goal: "After 3 minutes, power of generator is increased to 100 MW, power flow restriction of transmission line 112 is 120 MW, and fuel cost is minimized".

Under this condition, process flow operations of this control system will now be described with reference to FIGS. 6, 7 and 8. First, assuming now that the dispatching center 11 has such a large area knowledge "power increase/decrease of generator may be performed in unit of 10 MW", and then sets the subsequent subgoal based on this large area knowledge, which will be given to the generators 101 to 104.

Subgoal "After 3 minutes, power of generator is increased by 10 MW, and fuel cost is minimized".

With this subgoal, the generators 101 to 104 calculate the minimum fuel cost, namely the subgoal achievement performance required to increase the power of the generators by 10 MW after 3 minutes, taking account of their own local knowledge and their own conditions. It should be noted that as the local knowledge and conditions employed in this case, there is only off-line information such as a thermal efficiency and a local ratio. Otherwise there is other off-line information required to carry out more precise calculations, such as a condensation temperature, a vapor temperature, a burning condition of boiler, and operation condition of air ventilation. In this preferred embodiment, the fuel cost is given as the subgoal. In this case, for instance, in coal thermal power generation, a fuel amount required to change power of generators by a predetermined power value, namely fuel cost can be predicted by employing the method as described in Hitachi Hyoron publication "Fuel Technique for Large Capacity Coal Boiler" written by Takahashi, et al, in October 1987, volume 69, pages 7 to 14.

Subgoal Achievement Performance

Generator 101 "50,000 Yen"

Generator 102 "40,000 Yen"

Generator 103 "45,000 Yen"

Generator 104 "80,000 Yen"

In the dispatching center 11, upon receipt of this result, a provisional decision is made that the subgoal is executed by the generator 102 which is operable at the lowest fuel cost. Subsequently, a check is made to determine whether or not the power flow of the transmission line 112 is deviated from the supervising goal even when the provisional decision is performed. Assuming now that the dispatching about the system configuration as the large area knowledge, since the dispatching center 11 can calculate that the power flow of the transmission line 112 becomes 110 MW, it can be confirmed that the power flow is not deviated from the supervising goal. Thus, the dispatching center 11 makes a formal decision that the generator 102 executes the subgoal, and reports the execution instruction to the generator 102. A series of the above-described process corresponds to process 201 in FIG. 6. Similarly, processes 202 and 203 are executed. Subsequently, processes 204 to 207 shown in FIGS. 6 to 8 will be executed in this order.

Figure 6:
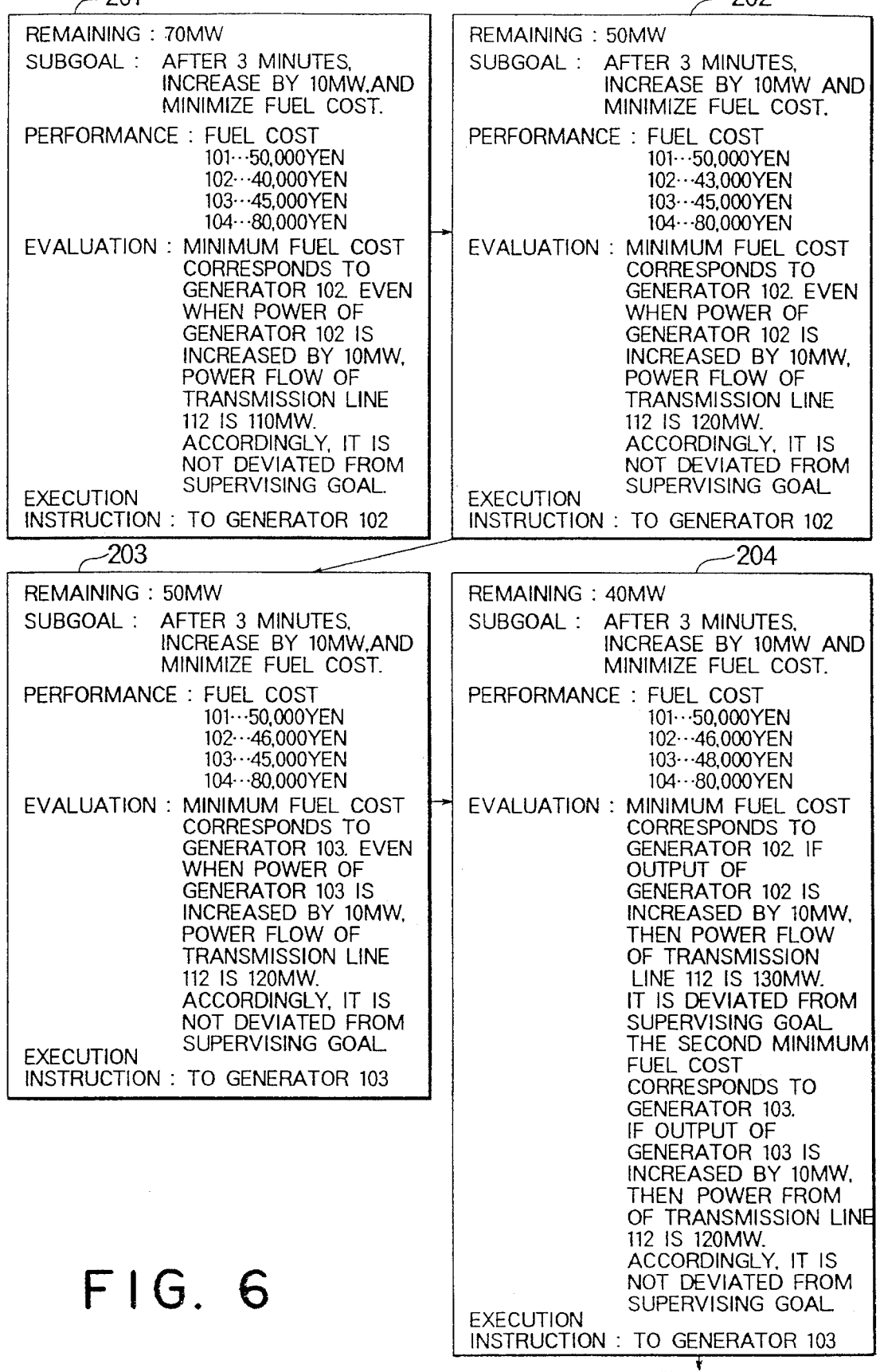

In the process 204 of FIG. 6, the minimum fuel cost was in the generator 102 at the beginning. However, as a result of calculation about the power flow of the transmission line 112 at this time, the resultant power flow becomes 130 MW which is deviated from the supervising goal. Then, if the power of the generator 103 whose fuel cost is the second lowest fuel cost is increased by 10 MW, it can be recognized that the power flow of this transmission line is not deviated from the supervising goal. As a consequence, a decision is made that the subgoal of the generator 103 is executed. Similarly, the process 205 is carried out.

At a process 206 shown in FIG. 7, the power output from the generators 101 and 102 cannot be increased in view of restrictions in the power flow of the power transmission line 112. Since the generator 103 already received the power-up instruction for a total of 30 MW at the previous processes 203, 204 and 205, the power up operation thereof cannot be expected by utilizing the rate limiter. To the contrary, a decision is made that since the generator 104 requires a high fuel cost, the power flow restriction of the transmission line 112 is mitigated to 130 MW, so that the subgoal is executed by the generator 102 whose fuel cost is the minimum value.

At a process 207 shown in FIG. 8, the power output from the generator 101 cannot be increased in view of the power flow of the transmission line 112. As the generators 102 and 103 already received the power-up instruction of 30 MW, the output power thereof cannot be increased by the rate limiter. The fuel cost of the generator 104 is considerably high. Then, the rate limiter is released at the dispatching center 11, a condition "release rate limiter" is added to the subgoal, and then answers of the subgoal achievement performance are waited for from the respective generators. As a result, in order to deviate from the power flow restriction of the transmission line 112, a decision is made that the subgoal is executed by the generator 103 whose fuel cost is the third lowest fuel cost.

As a result of the above-described processes, the generator 102 has received the power up instruction for a total of 30 MW at the processes 201, 202 and 206, whereas the generator 103 has received the power up instruction for a total of 40 MW at the processes 203, 204, 205 and 207.

Conventionally, since the output power of the generators has been determined based on rough information about these generators stored in the dispatching center, it is very difficult to obtain the optimum solutions. In accordance with this preferred embodiment, a quasi-optimal solution can be relatively easily obtained by utilizing the correct and detailed local knowledge and conditions. If the quasi-optimal solution can be obtained, the performance of the system can be improved, and utilization of the correct and detailed local knowledge and conditions may provide a high level of reliability.

Preferred Embodiment 3

Figure 9:
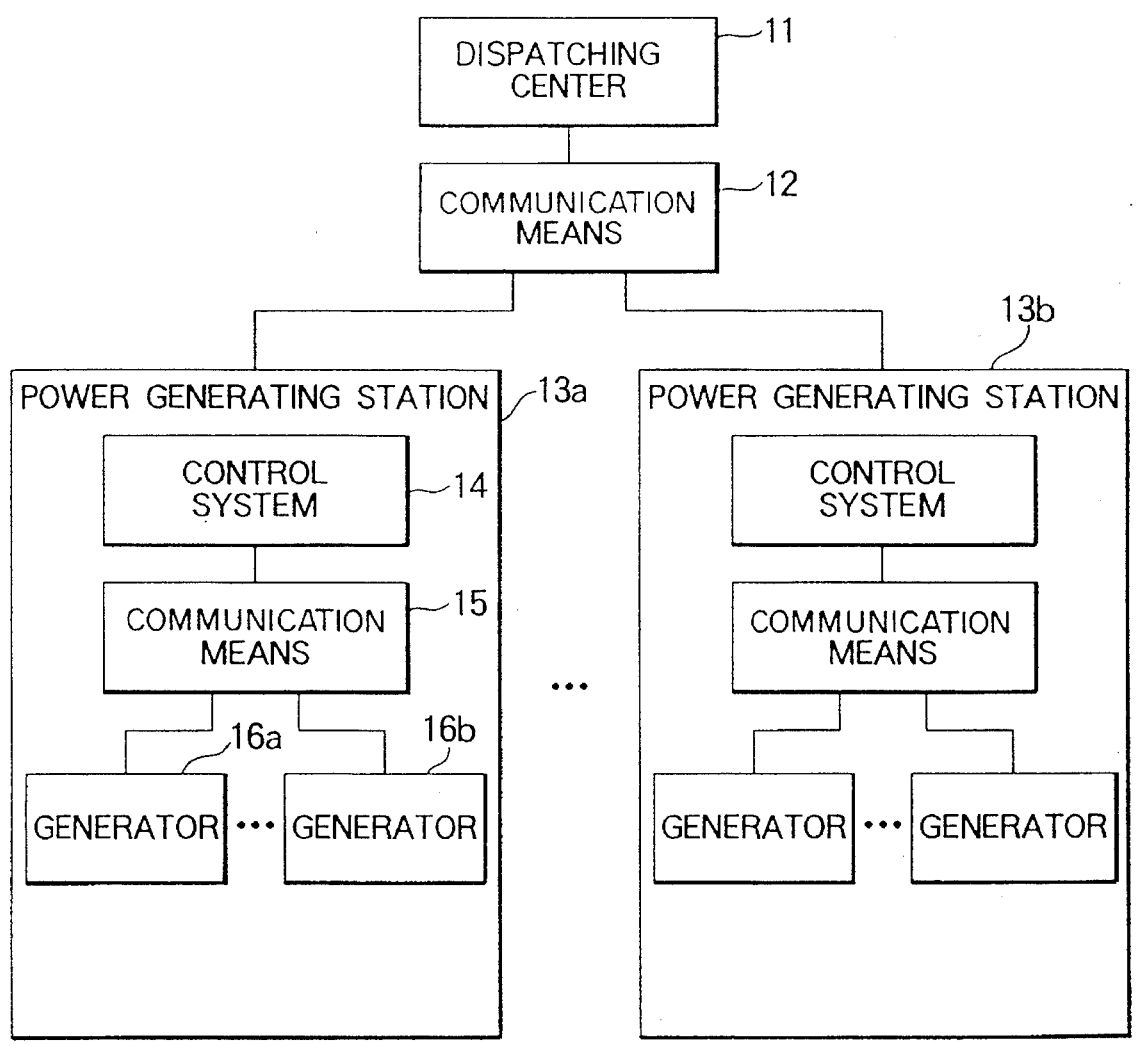
FIG. 9 is a schematic diagram for showing an example of a structure of a power generation system according to another example of the control system of the present invention.

In the above-described preferred embodiment 2, a simple system using the four generators has been employed. Normally speaking, one electric power company owns more than 10 power generating stations, and each of these power generating stations supervises several generators. In such a case, as the control system for determining the output power distribution of the generator as shown in the preferred embodiment 2, a system configuration shown in FIG. 9 may be used to replace the control system of FIG. 4. In FIG. 4, the dispatching center 11 is directly connected to the generators 101, 102, 103 and 104, whereas in the system arrangement shown in FIG. 9, power generating stations 13*a* to 13*b* are provided between the dispatching center 11 and the generators 16*a* to 16*b*, so that the communication efficiency may be improved. For instance, it is assumed that there are several tens of power generating stations 13*a* to 13*b*, and several generators 16*a* to 16*b*.

At this time, the following supervising goal is given:

Supervising Goal "After 3 minutes, power of generators is increased by 1000 MW, power flow restrictions of all transmission line are 2000 MW, and fuel cost is minimized".

When the power output from the generators is increased by 1000 MW in total, the previous method of the preferred embodiment 2 in which a small quantity of power increase such as 10 MW is separately instructed to a large quantity of generators, may cause the process efficiency to be lowered.

In such a case, the below-mentioned method is available in view of a higher process efficiency. The dispatching center 11 gives a subgoal, for instance, power-up instruction of 50 MW to the respective power generating stations 13a to 13b. For example, upon receipt of this instruction, the power generating station 13a subdivides this subgoal of 50 MW into 10 MW with regards to the generators 16a to 16b managed by this power generating station 13, and then executes a process operation similar to that of the preferred embodiment 2. The power generating station 13a reports to the dispatching center 11, its own fuel cost calculated in this process operation. Then, the dispatching center 11 evaluates the reports sent from the respective power generating stations, thereby transmitting the execution instruction, or defining the subgoals.

On the other hand, the supervising goal contains the power flow restrictions of the transmission lines. As to this point, when the dispatching center 11 evaluates the reports submitted from the power generating station functioning as the subsystem, since the transmission lines are located between the installations having larger levels than those of the power generating stations, the dispatching center 11 needs not to the separate reports of the generators 16a to 16b, but evaluates only the reports issued from the power generating stations 13a to 13b.

In accordance with this preferred embodiment, even when trouble happens to occur in the dispatching center 11, and therefore the supervising function cannot be executed, if the supervising function has been previously set to at least one of the power generating stations 13a to 13b, this power generating station can function as the dispatching center 11. As a consequence, it is possible to prevent that such a failure is spread to the entire system.

The detection of the occurrence of such trouble in the supervising subsystem may be realized by such a method for recognizing an occurrence of trouble in the case that no response is issued from the supervising subsystem for a time exceeding a predetermined time period.

Preferred Embodiment 4

Figure 10:
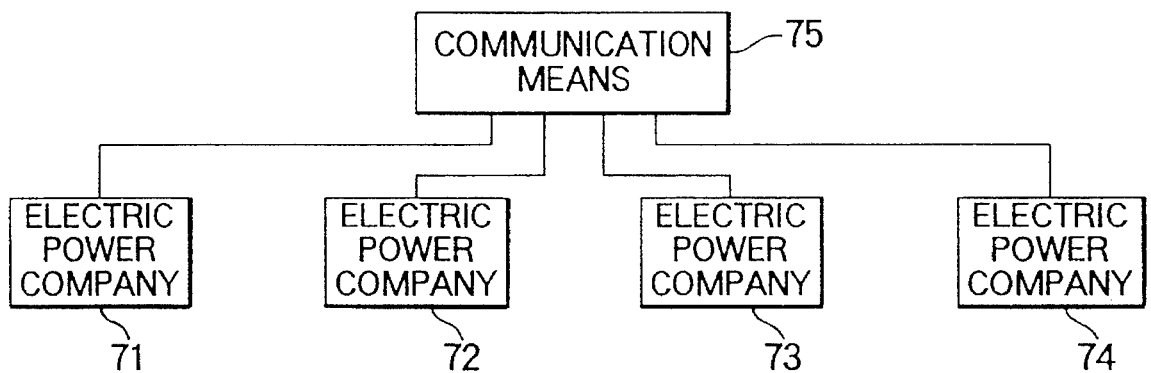
FIG. 10 is a configuration diagram for explaining an application of the control system according to the present invention, to a power dealing.
Figure 11:
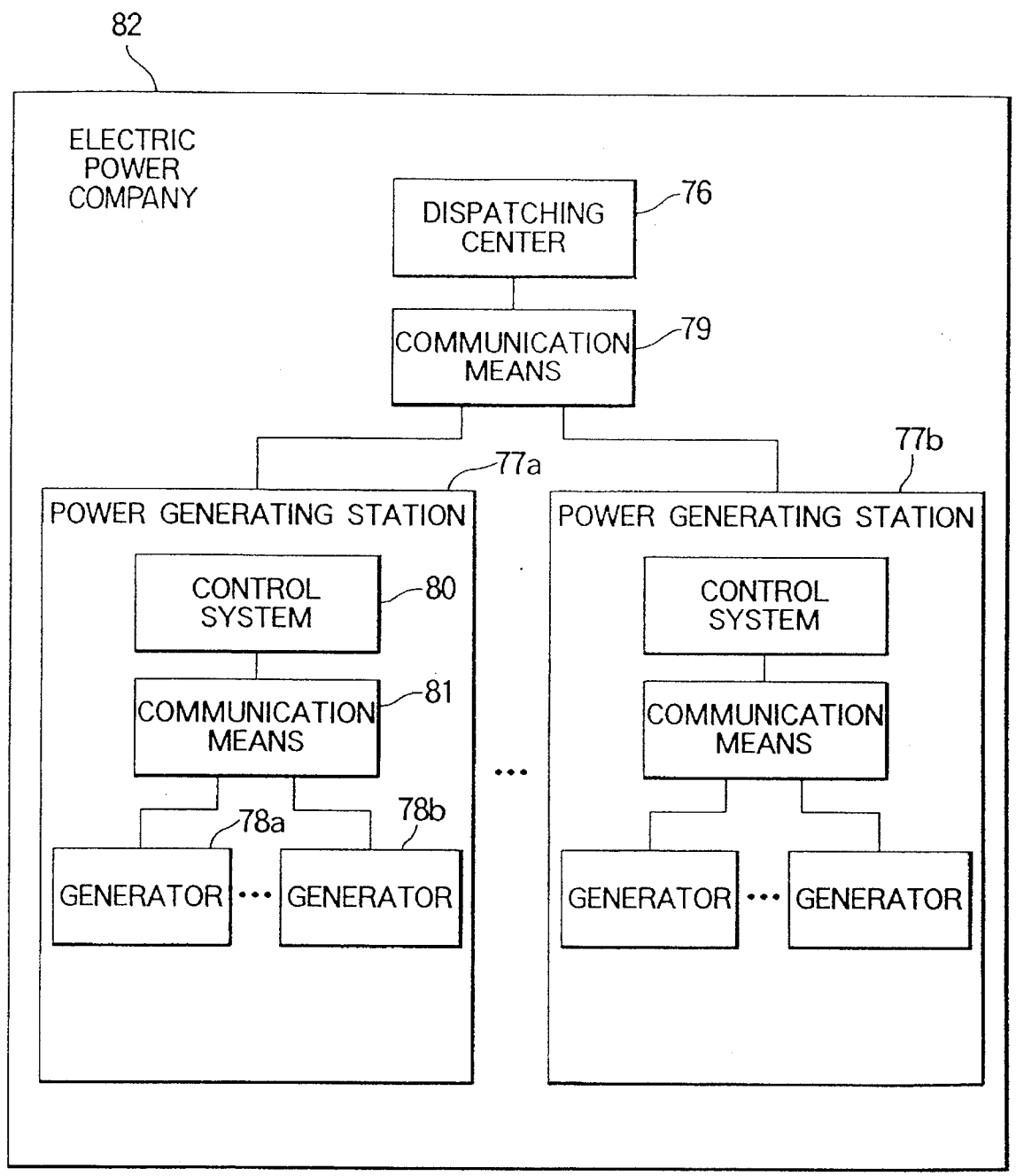
FIG. 11 is a schematic diagram for showing a hierarchical control structure of an electric power company shown in FIG. 10.
Figure 12:
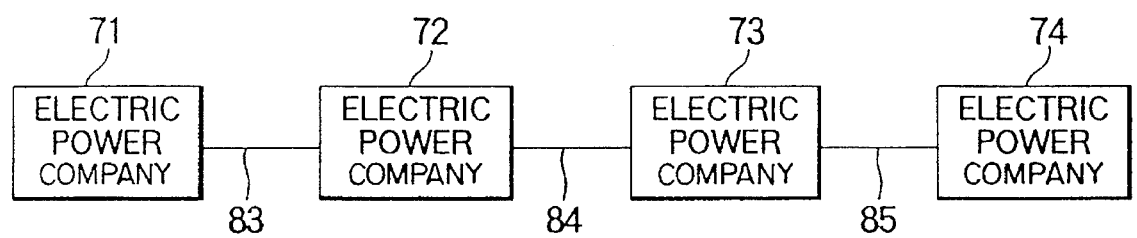
FIG. 12 schematically represents a system configuration for plural electric power companies shown in FIG. 10.

A description will now be made of such an example that a control system has been applied to a power dealing. As represented in FIG. 10, four electric power companies 71, 72, 73 and 74 can communicate with each other via communication means 75. Each of these electric power companies owns a hierarchical control structure having a dispatching center 76, power generating stations 77a to 77b, and generators 78a to 78b. As indicated in FIG. 12, the electric power companies 71 and 72, 72 and 73, 73 and 74 are connected with each other via tielines 83, 84 and 85, respectively, by which power generated by the respective electric power companies can be sold and purchase via the tielines. It is assumed that the electric power companies 71, 72, 73 and 74 each owns large area knowledge required for the power dealing, such as tieline connecting condition information and contract information with other electric power companies, other than the local knowledge such as a self-power generating capability.

Also, it is assumed that each of the electric power companies 71 and 72 wishes to purchase electric power of 1000 MW. First, the electric power companies 71 and 72 announces to all of the electric power firms via the communication means that this firm wants to buy electric power of 1000 MW. Next, in accordance with the contract information with other electric power companies, the electric power companies 71 and 72 evaluate which company has a purchase priority. As a result, a goal owned by the electric power company which owns the purchase priority will be handled as the supervising goal for the entire system. For instance, the following explanation will be made such that the electric power company 71 has the purchase priority. In this case, the electric power company 71 functions as the supervising subsystem for the power purchase contract.

A supervising goal of the electric power company 71 is as follows:

Supervising Goal "After 3 hours, electric power of 1000 MW is purchased, and a purchase cost is minimized".

Based upon this supervising goal, the electric power company 71 will give the following subgoal to other electric power companies 72, 73 and 74.

Subgoal "After 3 hours, electric power of 200 MW is sold, and purchase cost for electric power company 71 is minimized".

The electric power companies 72, 73 and 74 which have received this subgoal, make a decision about a power selling price using their own local knowledge, will interrogate a power generating station functioning as a lower system, if required, and furthermore calculates electric power transmission cost based on the large area knowledge. Then, the electric power companies 72, 73 and 74 send out as a purchase price, a total power transmission cost to the electric power company 71 under the condition that this purchase price is understood as the own subgoal achievement performance. It is assumed that the electric power company 71 has received the following subgoal achievement performance.

Subgoal Achievement Performance:

Electric Power Company 72 "10 millions yen",

Electric Power Company 73 "5 millions yen",

Electric Power Company 74 "4 millions yen".

In this case, the electric power company 71 makes a provisional decision that the electric power is purchased from the electric power company 71 which sells the electric power at the lowest cost, and will check whether or not there is another electric power company with a lower selling cost by giving the below-mentioned subgoal to the electric power companies 72, 73 and 74:

Subgoal "After 3 hours, electric power of 200 MW is sold, and purchase cost by electric power firm 71 is below 4 million yen".

Upon receipt such a subgoal, these electric power companies 72, 73 and 74 investigate the subgoal achievement performance, and then return to the electric power company 71, the following investigation result:

Subgoal Achievement Performance:

Electric Power Company 72 "Impossible"

Electric Power Company 73 "Impossible"

Electric Power Company 74 "Impossible".

As a result, the electric power company 71 makes a decision that electric power of 100 MW is purchased from the electric power company 74 after 3 hours, and sends an execution command to the electric power company 74.

With the repeating operations of the abovedescribed process, the electric power company 71 can make such a proper decision that the desirable electric power of 1000 MW is purchased from other electric power companies under a determined distribution rule at the minimum purchase cost, taking account of various conditions of these electric power companies.

Preferred Embodiment 5

Figure 13:
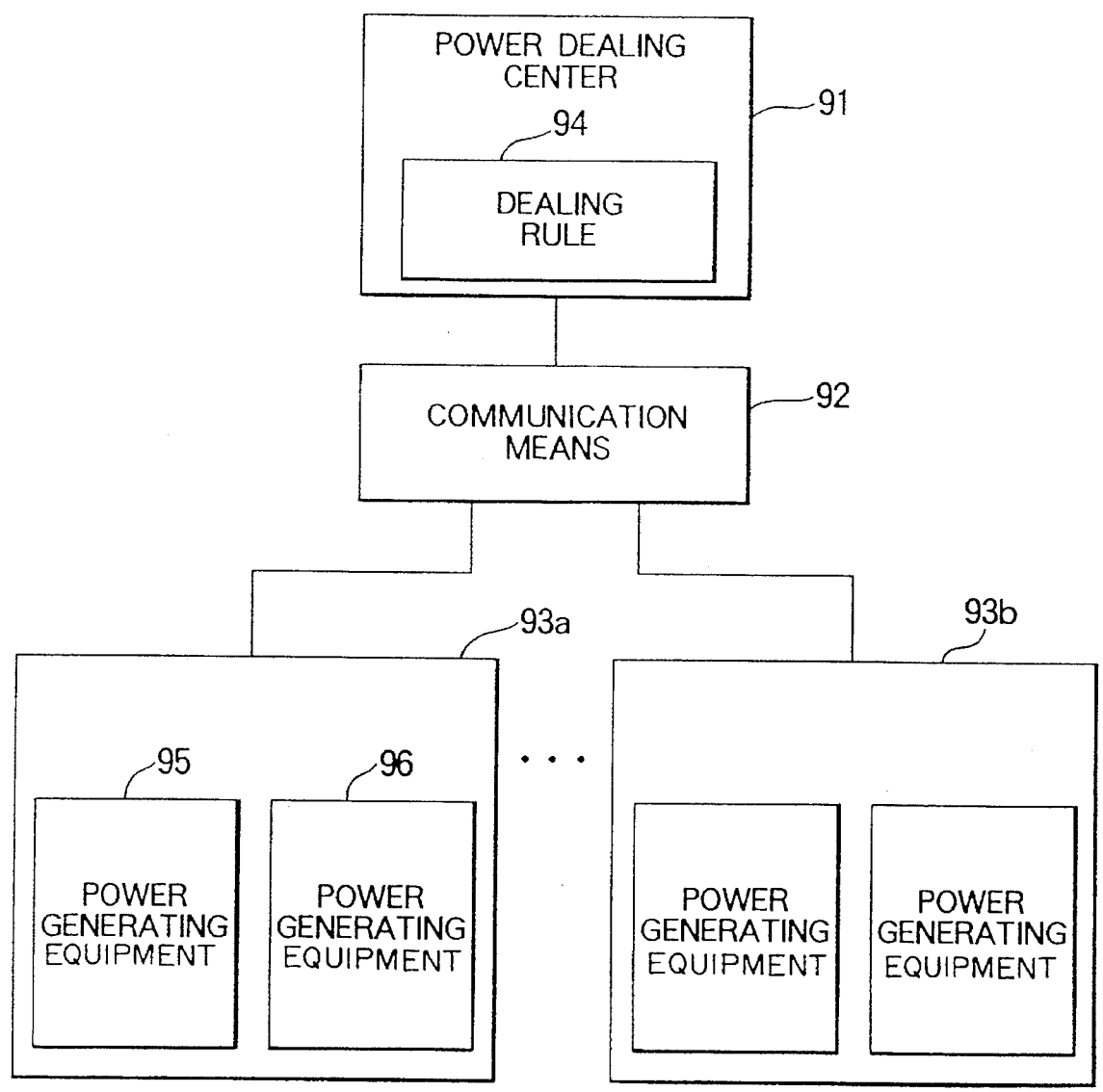
FIG. 13 schematically shows a system constructive diagram of a power dealing system for the control system according to the present invention.

A description will now be made of an example where a control system has been applied to a power dealing system. The power dealing system is arranged in, as shown in FIG. 13, that a power dealing center 91 and power dealers 93a to 93b are connected via a communication means 92 with each other. The power dealing center 91 owns a dealing rule 94 which is used as a supervising rule of the power dealing. Each of these power dealers 93a to 93b may have both of a power generating installation 95 and a power reserving installation 96, or may have only one of these installations. The power dealers 93a to 93b arbitrarily instruct a power selling order, or a power buying order to the power dealing center 91. The power dealing center 91 compares the content of order with the dealing rule, so that as a result of such a comparison, this power dealing center 91 temporarily passes a right of the supervising subsystem to the power dealer which has the top priority. The power dealer which could have the top priority, may decide a power dealer with a trade in a similar manner to that of the preferred embodiment 4. After the power trade has been completed, the dealer which has so far supervised the entire system, returns the right of supervising subsystem to the power dealing center.

As previously explained, the power dealing market can be supervised by employing a method such that the power dealing is managed by the electric power dealing center.

Preferred Embodiment 6

Figure 14:
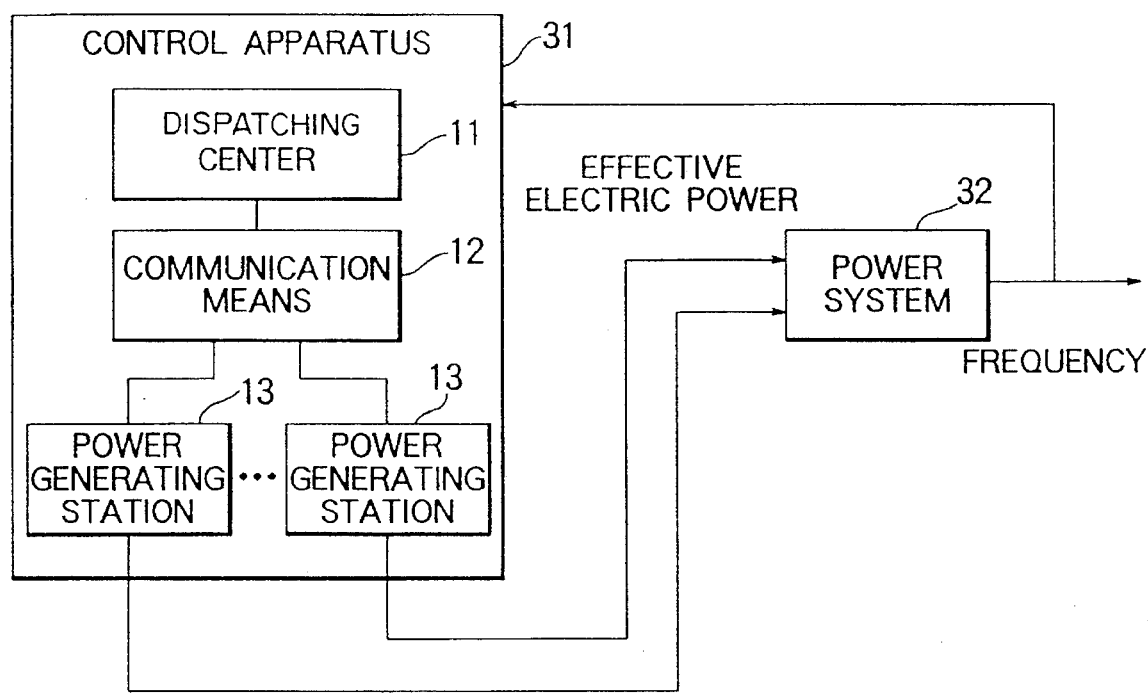
FIG. 14 schematically indicates a system constructive diagram for explaining an application of the control system according to the present invention, to a frequency control of a power system.

In FIG. 14, there is shown a frequency control system of an electric system as a concrete example in which a control system has been applied to a feedback control system. A control apparatus 31 is constructed of a dispatching center 11, communication means 12, and a power generating station 13. The power generating station 13 generates effective electric power functioning as an operation amount for controlling a frequency of a power system 32 to be controlled. The frequency as a control amount is fed back to the control apparatus 31. The dispatching center 11 makes a decision on a total power amount to be generated based on the feedback frequency, and then determines how to distribute this total power amount to the relevant power generating stations in a similar manner to that of the preferred embodiment 3.

The control can be optimized by controlling the frequency with employment of the local knowledge in a manner similar to those of the preferred embodiments 2 and 3.

In accordance with the preferred embodiments of the present invention, since the subsystem includes the condition detecting subsystem, even when the supervising subgoal contains the temporal element, the quasi-optimal solution can be obtained by utilizing the conditions of the subsystem. Especially, if the supervising goal is subdivided into very small subgoals, optional control can be maintained.

Also, even when an extraordinary events occur in the subsystem, the control system can readily accept this extraordinary event, irrelevant to the nature of the application range, so that the effective control can be achieved with a great deal of flexibility.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A method for controlling a power generating system including a plurality of power generating equipments; a supervising subsystem; and communication means for establishing communication between said power generating equipment and said supervising subsystem, all of said plurality of power generating equipment having a condition detecting subsystem for detecting local knowledge related to self performance and self condition of respective ones of said plurality of power generating equipment, and also said supervising subsystem having a supervising goal as said power generating system and large area knowledge required to supervise said power generating system, said method for controlling a power generating system comprising the steps of:

(a) dividing the supervising goal into a plurality of subgoals in said supervising subsystem and transmitting one of said subgoals to all of said plurality of power generating equipment via said communication means;

(b) calculating subgoal achievement performance of the respective subsystem with respect to said one of said subgoals transmitted to all of said plurality of power generating equipment, based upon the self local knowledge regarding the self performance and self condition of respective ones of said plurality of power generating equipment in each of said plurality of subsystems which have received said one of said subgoals transmitted to all of said plurality of power generating equipment, the calculated subgoal achievement performance being transmitted to said supervising subsystem via said communication means from all of said plurality of power generating equipment;

(c) comparing and evaluating said subgoal achievement performance respectively transmitted from all of said plurality of power generating equipment in said supervising subsystem in response to said one of said subgoals transmitted to all of said plurality of power generating equipment;

(d) redividing said supervising goal into further subgoals in said supervising subsystem if said supervision subsystem judges that the supervising goal should be redivided as a result of the comparison and evaluation in step (c), and thereafter reexecuting said steps (a) to (c) with respect to one of the redivided further subgoals; and (e) selecting, in said supervising subsystem a subsystem which has transmitted most preferable subgoal achievement performance in response to said one of said subgoals transmitted to all of said plurality of power generating equipment and sending a subgoal execution instruction to the selected subsystem if said supervising subsystem judges that the supervising subsystem should not be redivided as a result of the comparison and evaluation in step (c).

2. A method for controlling a power generating system as claimed in claim 1, wherein at least one of said plurality of power generating equipment includes a supervising goal as said control system and large area knowledge required to supervise said control system so that said at least one power generating equipment operates as said supervising subsystem.

3. A method for controlling a power generating system as claimed in claim 2, wherein as said condition in all of the power generating equipment, there is employed information containing a portion of a condensation water temperature, a vapor temperature, a burning condition of a boiler, and an operation condition of a draft system.

4. A method for controlling a power generating system as claimed in claim 1, wherein as said condition in all of the power generating equipment, there is employed information containing a portion of a condensation water temperature, a vapor temperature, a burning condition of a boiler, and an operation condition of a draft system.

5. A power distribution control system comprising:

a plurality of power generating stations each having at least one corresponding power generator;

a control station for supervising said plurality of power generating stations; and communication means for connecting said plurality of power generating stations with said control station, wherein:

each of said power generating stations includes means for detecting a condition of said at least one corresponding power generator related to power generation cost of said at least one corresponding power generating station, and local knowledge related to performance of said at least one corresponding power generator;

said control station has a goal of a power generation amount for an entire power distribution control system and global knowledge necessary for supervising said power distribution control system;

said control station divides said goal of power generation amount into a plurality of subgoals of fractional power generation amounts on the basis of said global knowledge, and transmits one of said subgoals to said plurality of power generating stations through said communication means to inquire power generation costs of said plurality of power generating stations;

each of said power generating stations calculates power generation cost assuming that said each power generating station has accomplished said transmitted subgoal by using said detected condition and said local knowledge, and transmits the power generation cost thus calculated to said control station through said communication means; and said control station selects a power generating station which calculated lowest power generation cost among the power generation costs transmitted and issues a command related to said transmitted subgoal to the selected power generating station.

6. A power distribution control system according to claim 5, wherein, in each of said plurality of power generating stations, said means for detecting a condition of said at least one corresponding power generator detects at least one of a condensate water temperature of said at least one corresponding power generator, a vapor temperature, a burning condition of a boiler, and an operating condition of a draft system.

7. A power distribution control system according to claim 5, wherein at least one of said plurality of power generating stations includes a supervising goal as said control system and large area knowledge required to supervise said overall control system so that said at least one power generating equipment operates as said supervising subsystem.

* * * * *